(12) United States Patent
Sines

(10) Patent No.: US 7,185,806 B2
(45) Date of Patent: Mar. 6, 2007

(54) FINANCIAL AND SIMILAR IDENTIFICATION CARDS READ BY MAGNETIC SWIPE CARD READERS AND METHODS RELATING THERETO

(76) Inventor: Randy D. Sines, East 5207 Third Ave., Spokane, WA (US) 99212

( * ) Notice: Subject to any disclaimer, the term of this patent is extended or adjusted under 35 U.S.C. 154(b) by 0 days.

(21) Appl. No.: 10/918,683

(22) Filed: Aug. 12, 2004

(65) Prior Publication Data

US 2006/0032906 A1    Feb. 16, 2006

(51) Int. Cl.
  *G06K 5/00*    (2006.01)
(52) U.S. Cl. ........................ 235/380; 235/449
(58) Field of Classification Search ................ 235/380, 235/449, 451, 492, 493; 705/44; 713/155
  See application file for complete search history.

(56) References Cited

U.S. PATENT DOCUMENTS

| | | |
|---|---|---|
| 4,720,860 A | 1/1988 | Weiss |
| 5,168,520 A | 12/1992 | Weiss |
| 5,237,614 A | 8/1993 | Weiss |
| 5,361,062 A | 11/1994 | Weiss et al. |
| 5,478,994 A | 12/1995 | Rahman et al. |
| 5,479,512 A | 12/1995 | Weiss |
| 5,485,519 A | 1/1996 | Weiss |
| 5,623,552 A | 4/1997 | Lane |
| 5,657,388 A | 8/1997 | Weiss |
| 6,095,416 A | 8/2000 | Grant et al. |
| 6,188,309 B1 | 2/2001 | Levine |
| 6,257,486 B1* | 7/2001 | Teicher et al. ............. 235/380 |
| 6,505,772 B1 | 1/2003 | Mollett et al. |
| 6,595,787 B2 | 7/2003 | Fork et al. |
| 2001/0011684 A1* | 8/2001 | Krause ....................... 235/492 |
| 2002/0032657 A1* | 3/2002 | Singh .......................... 705/44 |
| 2003/0052168 A1 | 3/2003 | Wong |
| 2003/0057278 A1 | 3/2003 | Wong |
| 2003/0135731 A1* | 7/2003 | Barkan et al. .............. 713/155 |
| 2005/0133606 A1* | 6/2005 | Brown ....................... 235/493 |

* cited by examiner

*Primary Examiner*—Michael G. Lee
*Assistant Examiner*—Kristy A. Haupt
(74) *Attorney, Agent, or Firm*—Gregory IPL; Randy A. Gregory

(57) ABSTRACT

Apparatus forming a portable charge, debit or similar identification card which can be read using a magnetic card reader and methods for securing information are described. The preferred apparatus includes a magnetic stripe for storing information, a jamming assembly configured to emit a jamming signal which temporarily renders at least a portion of the magnetic stripe unreadable when the card is swiped through the card reader without first entering correct authentication data, and a power source adapted to supply power to the jamming assembly. Other features are also disclosed.

23 Claims, 9 Drawing Sheets

FINANCIAL AND SIMILAR IDENTIFICATION CARDS READ BY MAGNETIC SWIPE CARD READERS AND METHODS RELATING THERETO

TECHNICAL FIELD

The invention relates to credit, debit and other financial or other identification cards used to store information which is to be read by a magnetic card reader, such as the common magnetic stripe or strip card readers which involve swiping the card through the reader.

BACKGROUND OF THE INVENTION

In the United States, in particular, and in other countries, many financial and other identification cards are relatively simple magnetic stripe cards. In the past these cards have typically had the account number information, account name, expiration date and in some cases a "security code" included in legible form embossed or printed onto the exterior of the cards. Anyone can read this information and it may in many instances be misused if in the wrong hands.

The above form of identification card has also been found susceptible to theft and use in making fraudulent transactions. In many instances the card is stolen and then an unauthorized user employs the card in making charges against the associated account. This is easily done at automated card reading stations at fuel stations, by phone, and at other merchants. This may continue until such time as the card is reported stolen and the account associated therewith is inactivated throughout the card data processing system.

The typical procedures for inactivation of a stolen card account does not involve any inactivation process to the stolen card itself. Instead, the approval process relies on centralized information and data processing systems and added processing steps to stop further fraudulent activity. Thus, the card itself is not changed and can still be accessible for fraud of limited types.

This approval also requires that when a card is lost or stolen, the affected person must obtain a new account number and await delivery of a new card to provide renewal of the original level of security associated therewith. This is an inconvenience. There is also the added risk additional fraudulent charges may be made despite efforts to inactivate the account.

In addition to stolen card fraud there is also a sizeable amount of fraud that occurs by duplicitous, but rightful, account holders or users. In this type of fraud, sometimes called "account holder fraud" or "card holder fraud", the card holder will purchase one or more items using the charge or debit card and then report the card as having been stolen.

The procedures for dealing with stolen cards, and the difficulties associated with investigations, are such that much of this cardholder fraud goes by undetected without assignment of costly investigation, and without prosecution by government officials. Such investigation and prosecution are often not of high enough priority for these officials to take action. Some financial card issuers believe card holder fraud represents the largest segment of fraud involving these types of cards.

The problem of cardholder fraud has in part been addressed in the case of some debit cards by requiring entry of a personal identification number (PIN) at the place of use on a card reader. This has typically been done using a key pad entry device located at the place of use, which is part of the card handling system. This has also been employed in some cases in connection with credit, debit and other types of magnetic identification cards.

This approach reduces the problem of cardholder fraud and stolen card fraud but does not address the various situations where the more simplified magnetic stripe card readers are employed that use no PIN or other confirmation in addition to the card number or other information provided on the physical card. This includes most charging machines and telephone charges. Since these are the largest part of the card charges made, there is still risk of fraud. Nonetheless there are magnetic stripe card readers and there are still vast numbers of locations at which fraud of these and other types can be easily effected.

In an effort to stem the costs of card fraud, there has been a substantial amount of development of financial cards that are called "smart cards". Such smart cards typically employ an electronically programmable integrated circuit or circuits that have permanent memory. The smart cards are programmed for a particular user and account, and are difficult to alter for use in fraudulent transactions by others. This technology has been more widely adopted in European and some other foreign countries than it has within the United States. Since the United States has many magnetic strip card readers, the newer technology smart cards have not solved the problems associated with striped cards and stripe readers.

A prominent disadvantage of smart cards is that they require a smart card reader that is specifically adapted to read the particular type of smart card being employed. The smart card technology that has been developed varies. There are a number of different types of smart cards with complementary smart card readers. The readers are not the same, and a correct type of reader is needed to read a particular type of smart card design. Since there are many smart cards with associated proprietary readers, this has deterred their acceptance in the United States and elsewhere. At this time there is no single standard for smart cards.

Even if a consistent standard for smart card readers could be agreed upon by country or industry, the replacement of the large number of existing magnetic stripe card readers would be very costly and has been strongly resisted by merchants in the United States. This resistance is in part due to the costs of replacing the existing magnetic stripe card readers.

Further aggravating the problem of fraud related to magnetic stripe cards is the complication that current charge card processing policies may impose all losses, costs and/or penalties on the merchants that suffer such fraudulent transactions. The merchants may end up not being paid for the merchandise, and may be penalized on their merchant account for transactions that turn out to be fraudulent, or both. Although these costs might seem to justify replacement of magnetic stripe card readers, much of the retail merchant industry has not yet accepted smart card technology as the appropriate next step in this technological area. Smart cards do not solve all problems and have not gained widespread adoption in many countries.

For these and possibly other reasons, the smart card technologies available have not been widely accepted for use as financial cards in the United States and many other countries that continue to use magnetic stripe reader technology. Accordingly, there are a very large number of merchants that continue to use magnetic stripe readers in making charge and debit account transactions. This continued use of magnetic stripe readers is expected for many years despite the very large volume of fraudulent transactions being made. These fraudulent transactions not only cause costs to be incurred by merchants, they also cause costs to be incurred by the financial industry and insurance companies that insure merchants, banks and other industries against fraud losses associated with charge cards.

Another problem area relevant to financial identification cards are systems that have key pad entry stands adjacent to the magnetic card readers in view of other people. Such systems are commonly used by swiping the magnetic stripe cards though a reading slot in the card reader. The user then uses the key pad to input the PIN. Such systems are typically used at automated bank tellers and at many retail merchant locations.

Although such PIN input card reader systems add the ability to enter a PIN at the time of transaction, such entry of the PIN may be observed by others standing in line. Additionally, more sophisticated techniques, such as using audio waves, radio waves, or imaging, may be used to capture this sensitive information. Such sophisticated techniques may be completely undetectable by the store personnel or customers being subjected to fraud or collection of information that can be used to commit fraud.

There has been resistance to adopting and using card readers with visible PIN input by many individuals due to the above and other security problems.

Additionally, the bulk of magnetic stripe card readers are not set up with an associated key pad entry station and the majority of electronically processed transactions continue to be processed without use of any PIN entry by the card user due to the established procedures for processing such transactions. This makes fraudulent use of magnetic stripe financial identification cards easier with regard to both stolen cards and fraud practiced by cardholders as explained above.

In view of these and other considerations, there remains a need for an improved magnetic stripe card that can be read using existing and future magnetic stripe card readers, yet provides reduction in card fraud and greater convenience and security.

BRIEF DESCRIPTION OF THE DRAWINGS

Preferred embodiments of the invention are described below with reference to the following accompanying drawings. It should be noted that some drawings are not to scale in order to best show the described features.

DETAILED DESCRIPTION OF THE PREFERRED EMBODIMENTS

General Comments

Introductory Note

Figure 1:
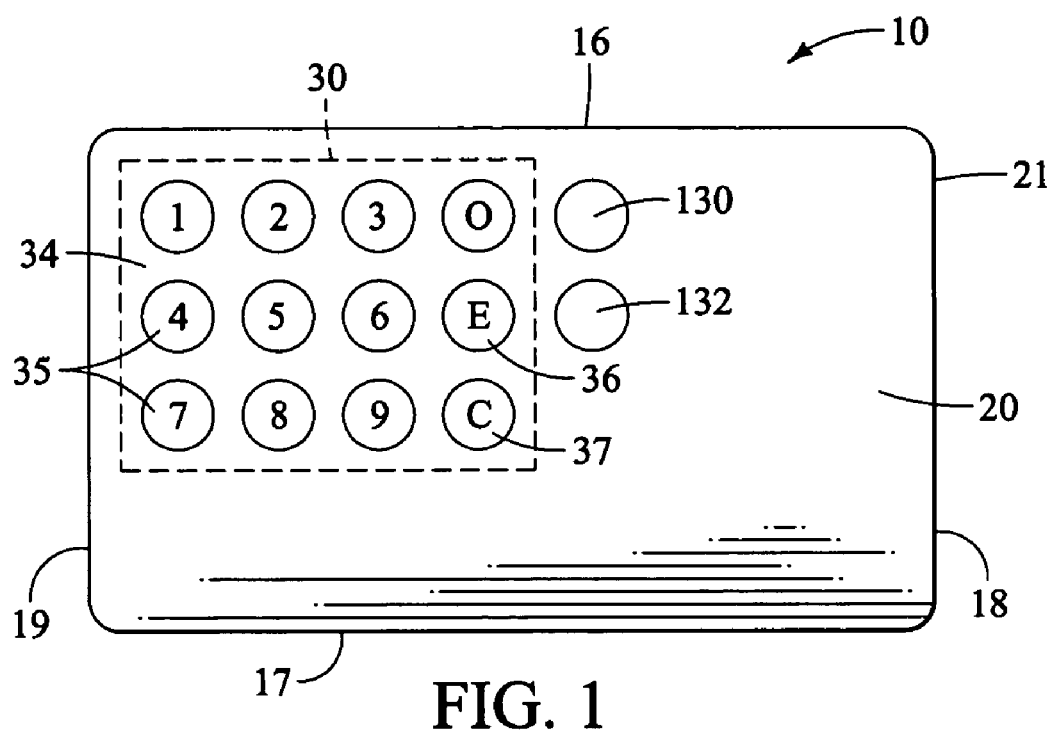
FIG. 1 is a front view of one exemplary card in accordance with one embodiment of the present invention.

The readers of this document should understand that the embodiments described herein may rely on terminology used in any section of this document and other terms readily apparent from the drawings and language common therefor. This document is premised upon using one or more terms with one embodiment that may also apply to other embodiments for similar structures, functions, features and aspects of the invention. Wording used in the claims is also descriptive of the invention and the text of the claims is incorporated by reference into the description entirely in the form of the claims as originally filed. Terminology used with or applicable to one, some or all embodiments may be used for describing and defining the technology and exclusive rights associated herewith.

The Card in General

Embodiments according to the present invention are now described in detail with reference to FIGS. 1–12. When referring to the drawings, like numerals are used to indicate the same or similar elements if multiple embodiments are shown.

Referring first to FIGS. 1–10, an apparatus forming a portable charge, debit or similar identification card is generally indicated by the numeral 10. Card 10 preferably includes a magnetic stripe or strip 12 for storing encoded information which can be read using a conventional magnetic card reader 14. This is often used for identification but could be for other purposes, such as amount of cash available or other information. The current conventional stripe has an industry standard allocation of bits for various types of data and different multiple tracks. Alternative configurations may also be equally acceptable.

Because magnetic stripes for storing encoded information and magnetic card readers configured to read the encoded information are well known, this document will not review the fundamental technology related to magnetic stripes and their applicable card readers. Instead, this document will describe new apparatuses and methods for utilization of this technology.

A preferred card 10 contemplated by the present invention can be any suitable size or shape. However, card 10 is preferably of a rectangular shape, and of a size similar to, or the same as, that commonly used for conventional financial cards (e.g., credit cards and debit cards).

The rectangular shape of the card 10 is defined in part by a top edge 16, a bottom edge 17, a right edge 18 and a left edge 19. The card 10 has a front surface 20 and a back surface 21. The edge corners may be rounded such as the quarter-circular shape shown. One may appreciate that by shaping and sizing the card so that it is the same as, or similar to, conventional financial cards, the card 10 is more likely to be readily recognized and accepted by existing or standardized card readers and their users and merchant owners. Advantageously, card 10 can be swiped through and read by a variety of conventional magnetic card readers 14.

Card 10 may include written, embossed, or other information on the front or back surfaces 20, 21 of the card 10, if desired. However, the inclusion of such information is not required. Such information can include data which is commonly included on conventional financial cards. By way of example, this information can include such things as: the account number, the card holder's name, the date the card holder became a member (i.e., member since data), the expiration date, logos, photographs, and/or signatures. Any other information may be included or deleted from the outer surface of the card as desired or required.

The Magnetic Stripe

Figure 2:
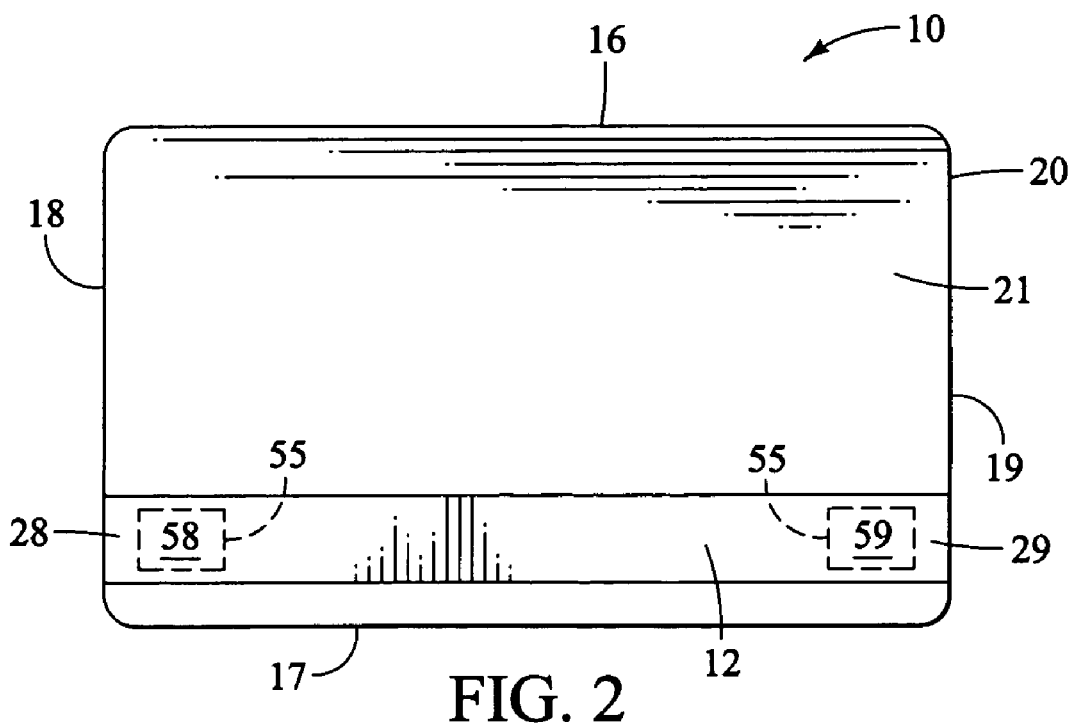
FIG. 2 is a back view of the card of FIG. 1.
Figure 6:
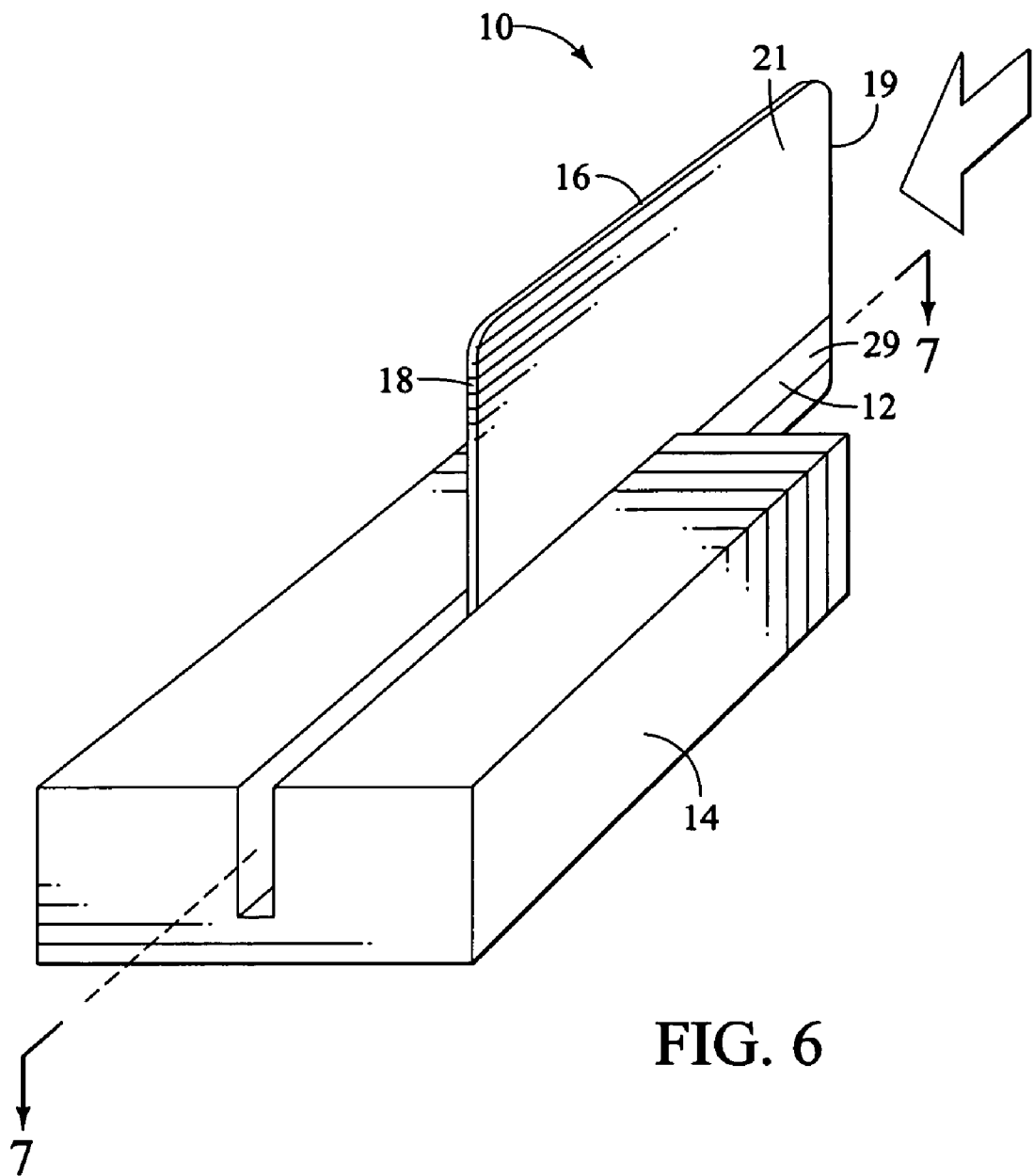
FIG. 6 is a diagrammatic perspective view showing the card of FIG. 1 as it is swiped through a card reader or a relevant portion of a card reader system.

FIGS. 2 and 6 show that card 10 also includes a magnetic stripe 12 for storing magnetically encoded information that is read by reader 14. The card stored information or data can be encoded on the magnetic stripe 12 in accordance with any suitable data format. It can also be used with other forms of data stored on card 10. In addition, the information can be stored at any suitable location (e.g., track) on the magnetic stripe 12, although industry conventions or standards will typically apply. In the preferred embodiments this is done in accordance with international standards so typical swipe readers readily read all cards.

As shown in FIGS. 2 and 6, the magnetic stripe 12 can be located on the back surface 21 of the card 10 along a lower edge. However, locating the magnetic stripe 12 on the back surface 21 in alternative locations is potentially acceptable. The stripe 12 can alternatively be located in any other suitable position on, in or otherwise included as part of card 10. The magnetic stripe 12 is preferably positioned so that the magnetic stripe 12 will be in proper alignment to be read when the card 10 is swiped through a conventional (or particular) card reader 14 being used (as represented diagrammatically in FIG. 6).

As best shown in FIG. 2, the magnetic stripe 12 may extend substantially between the right and left edges 18, 19 over the back surface 21 of the card 10. Other configurations may be desirable and possible. The magnetic stripe 12 has a first end 28 which is located near the right edge 18 of the card 10, and a second end 29 which is located near the left edge 19 of the card 10. The first and second ends could alternatively be inverted.

The Card User Detector or Input Device

FIGS. 1 and 3–5 show some preferred cards according to various aspects of the inventions. The cards include at least one detector for sensing actions, attributes or other charactertitics of a user. The detection may be accomplished using an input device 30 requiring manipulation, or it can be a device that serves passively (thumbprint), or actively by interrogation of the user's body to determine biological information. The input, such as a PIN, thumbprint, retinal scan, etc. can be combined with one or more other authentication fields to indicate authenticity or non-authenticity of the user. Biological information or other authentication data may be used in combination with user active input data, such as a PIN.

The input device or devices are generally illustrated as a box 30 shown in phantom lines. The input device or other detector 30 may be adapted for a user to enter verification or authentication data, and can be of various suitable designs. In addition, the input device 30 can be located at various suitable positions on the card 10 or could be attached thereto in a suitably durable fashion to allow input of the user input data. The user input or other detection system may be cooperatively operated with one or more indicators or displays such as described below.

Referring to FIG. 1, in one implementation detector 30 comprises at least one key, such as a keypad 34 located on the front surface 20 of card 10. Keypad 34 is adapted to receive or detect user input, such as the authentication data entered by the user. Here the keypad 34 includes a plurality of numerical keys 35 which can be sequentially pressed to enter data, such as authentication data, for example, a personal identification number (PIN), or other means for verifying or authenticating the user. The required input may be variable from use to use or static and similar for each use.

Keypad 34 may also include one or a multiple of function keys, such as an enter key 36 and clear key 37. The enter key 36 is to be pressed by the user once the PIN has been successfully entered. Pressing the enter key 36 will cause the PIN to be sent to the processor (as described below).

Keypad 34 can also include a correct or clear key 37. The correct key 37 can be pressed by the user to backspace or clear an incorrectly entered PIN, so that the user can clear the erroneous entry and try again to enter the correct PIN. In one version of the inventions, the correct key 37 will allow the user to delete an incorrectly entered PIN as long as the enter key 36 has not already been pressed by the user.

Biometric Input Embodiment

Figure 3:
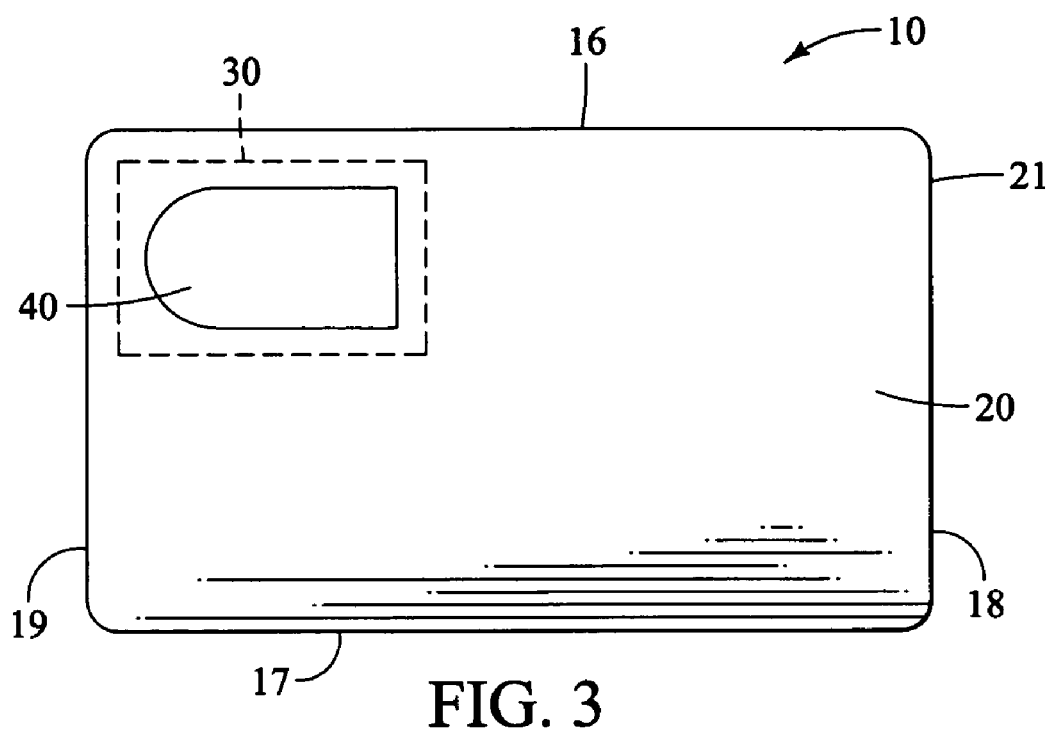
FIG. 3 is a front view of a second card in accordance with another embodiment of the present invention.
Figure 4:
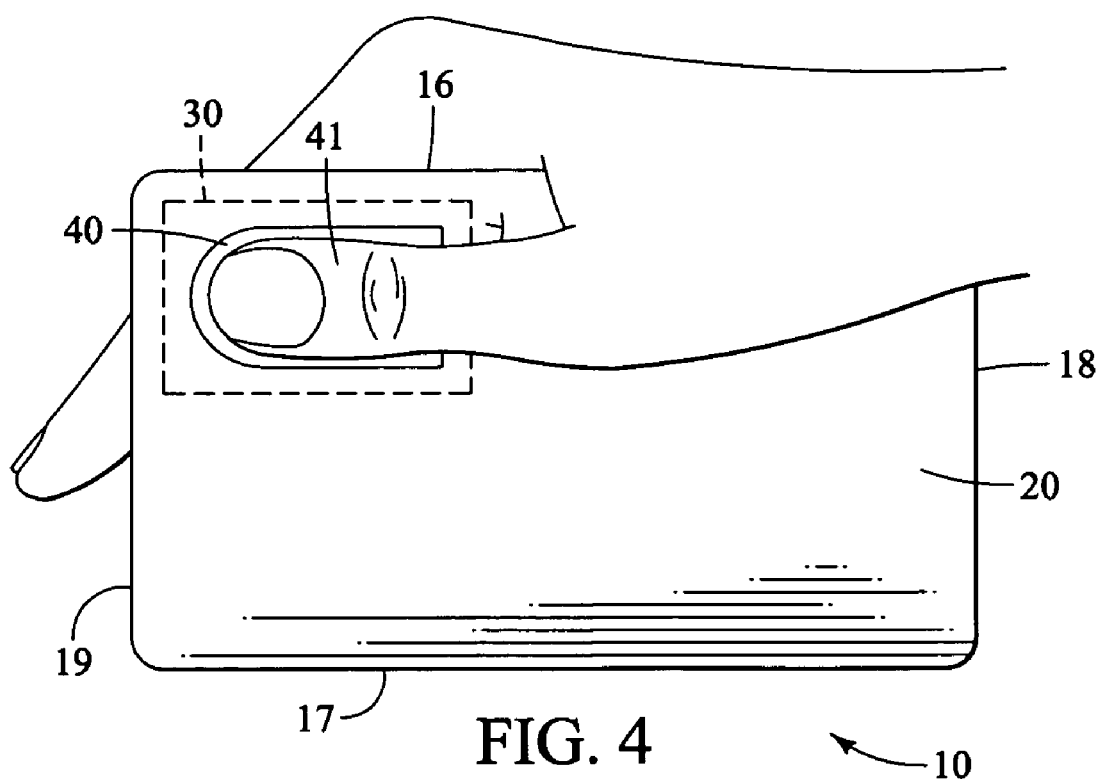
FIG. 4 shows a user grasping the card of FIG. 3 so that thumbprint information can be obtained.

Referring to FIGS. 3 and 4, in another preferred implementation, the input device 30 or other detector may comprise a biometric sensor 40 adapted to receive the authentication and any other needed data. The use of any suitable biometric sensor is contemplated by the present invention, whether now known or hereafter developed.

In FIG. 4, the biometric sensor 40, as shown, is configured to receive the user's fingerprint or thumbprint which can then be used as the authentication data. When such a biometric sensor 40 is employed, the step of entering authentication data can comprise the user placing a digit 41 (such as his or her finger or thumb) on the biometric sensor 40. Once the biometric sensor 40 has scanned or otherwise read the fingerprint, thumbprint, etc. (i.e., authentication data), the fingerprint data is sent to the processor (as described below).

The Processor and Memory

Figure 5:
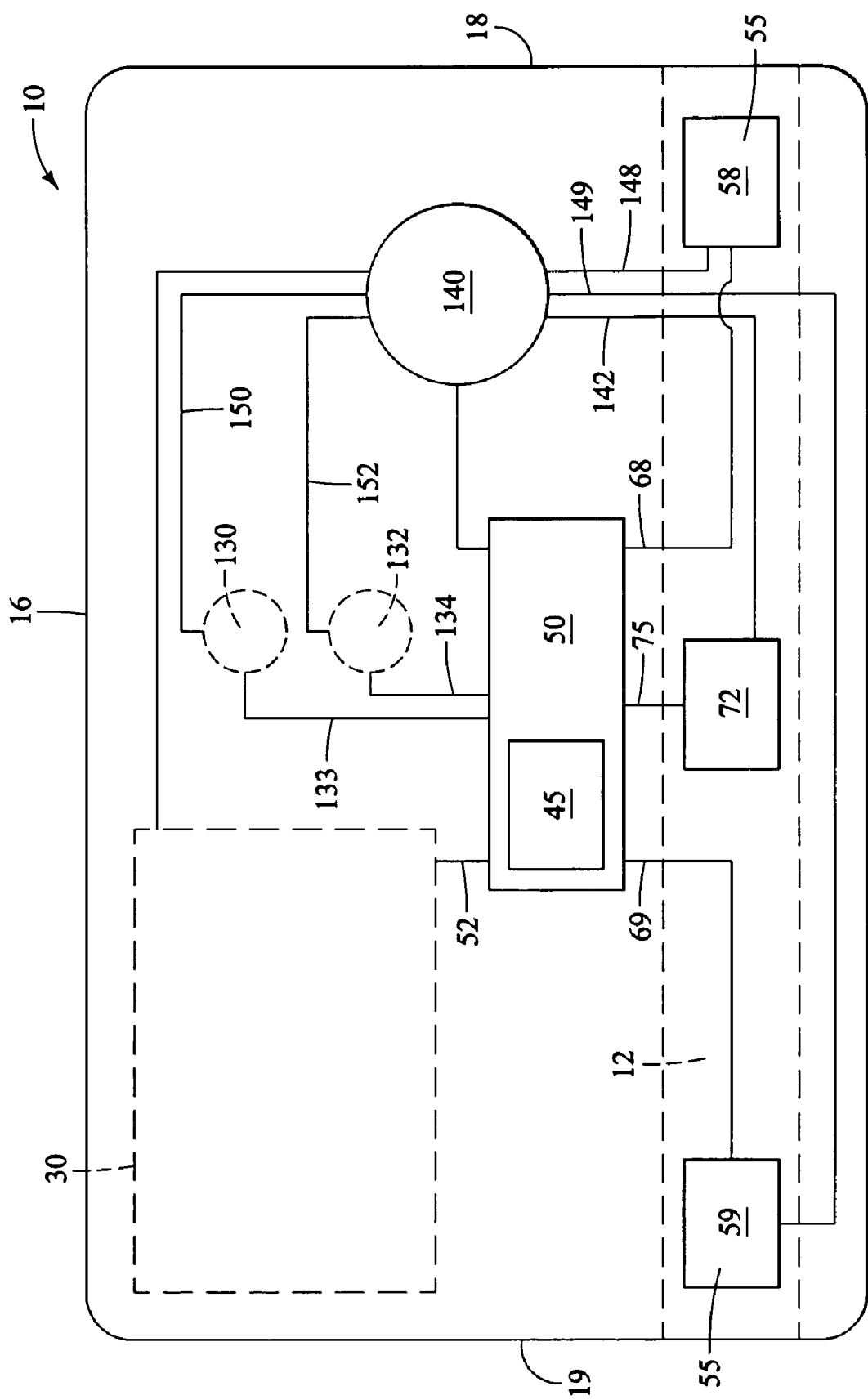
FIG. 5 is a diagrammatic view of the internal components of the card of FIG. 1.

As best shown in FIG. 5, card 10 may include a memory 45 which is configured to store reference data and facilitate processing, as needed. This reference data can be a PIN, a fingerprint, and/or any other suitable reference data or combinations or subcombinations of reference data fields thereof which will be useful in the authentication process.

Card 10 also includes a processor 50. Processor 50 is configured to in part perform the electronic and related processing, such as comparing the authentication data entered by the user to the reference data stored in the memory 45 to determine whether the authentication data entered by the user matches the reference data. In other words, the processor 50 determines whether the authentication data entered is correct authentication data (i.e., authentication data which matches the reference data). The memory 45 can be incorporated within the processor 50 as shown in FIG. 5, or the memory 45 can be separate from, but in communication with, the processor 50.

In operation, a user will enter authentication data (e.g., a PIN) using the user input device 30. For example, in one implementation, the user can enter a PIN using the number keys 35 on the keypad 34. After the PIN has been entered, the user can press the enter key 36 to send the PIN (i.e., authentication data) to the processor 50 by input processor connection 52.

Once the authentication data (e.g., PIN, biometric and/or other data) is entered by the user and has been received by the processor 50, the processor 50 performs by comparing the authentication data (e.g., PIN) entered by the user to the reference data stored in the memory 45 to determine whether the authentication data (e.g., PIN) entered by the user matches or is otherwise accepted in relation to the reference data stored in the memory 45. In other words, the processor 50 determines whether the authentication data entered is correct or otherwise acceptable. In this situation the reference data stored in memory 45 would be the user's PIN which had been earlier placed into the memory 45.

In another implementation, the user can place a digit 41 (e.g., his or her finger or thumb) on the biometric sensor 40. The fingerprint (or thumbprint) is then captured or otherwise scanned by the biometric sensor 40 and sent to the processor 50 by input-processor connection 52. Once the authentication data (e.g., fingerprint) entered by the user has been received by the processor 50, the processor 50 compares the authentication data (e.g., fingerprint) entered by the user to the reference data stored in the memory 45 to determine whether the authentication data (e.g., fingerprint) entered by the user matches the reference data stored in the memory 45. In other words, the processor 50 determines whether the authentication data entered is correct. In this situation the reference data stored in memory 45 would be the user's fingerprint or thumbprint which had been earlier placed in the memory 45.

The methods and operation of the inventions described herein may also include multiple authentication subroutines. For example, a card may include both a thumbprint detector and a plurality of numerical keys. This or other combinations may be used to enhance security by requiring both input of a PIN and detecting the thumbprint followed by successfully matching both the thumbprint information and PIN information. Other combinations and subcombinations of available fields may be desirable and implemented according to the inventions.

The Swipe Sensor Assembly

Referring once again to the figures, with emphasis now to FIG. 5, the card 10 is shown to include a swipe or read sensor assembly 55 which is configured to detect when the card 10 is swiped through the magnetic card reader 14 (as shown in FIGS. 6–9). The use of any suitable sensor design is contemplated by the present invention. In one implementation, the sensor assembly 55 includes a plurality of sensors (e.g., first sensor 58 and second sensor 59). The plurality of sensors can be located in any suitable positions on the card 10. For example, in the implementation shown in FIG. 5, the sensors 58 and 59 are positioned near the ends of the magnetic stripe 12.

In some of the preferred forms of the inventions, a portion of the sensor assembly 55 is positioned beneath the magnetic stripe 12. This location not only places the sensor assembly 55 in position to detect the card reader 14, but also makes it difficult for anyone to successfully remove the sensor assembly 55 from the card 10 without destroying the magnetic stripe 12, and permanently disabling the card 10. FIG. 2 shows one configuration for the positions of first and second swipe sensors 58 and 59 in phantom lines.

Turning now to FIGS. 2 and 5–7, various aspects of the reader sensor assembly 55 are now further described. In one implementation, the first and second sensors 58 and 59 comprise card reader head detection coils (i.e., first detection coil 58, and second detection coil 59). The first detection coil 58 is positioned near the first end 28 of the magnetic stripe, while the second detection coil 59 is positioned near the second end 29 of the magnetic stripe 12. Each of the detection coils 58 and 59 are located beneath the magnetic stripe 12. They are adapted to sense passage of a magnetic or other card reading characteristic.

Figure 7:
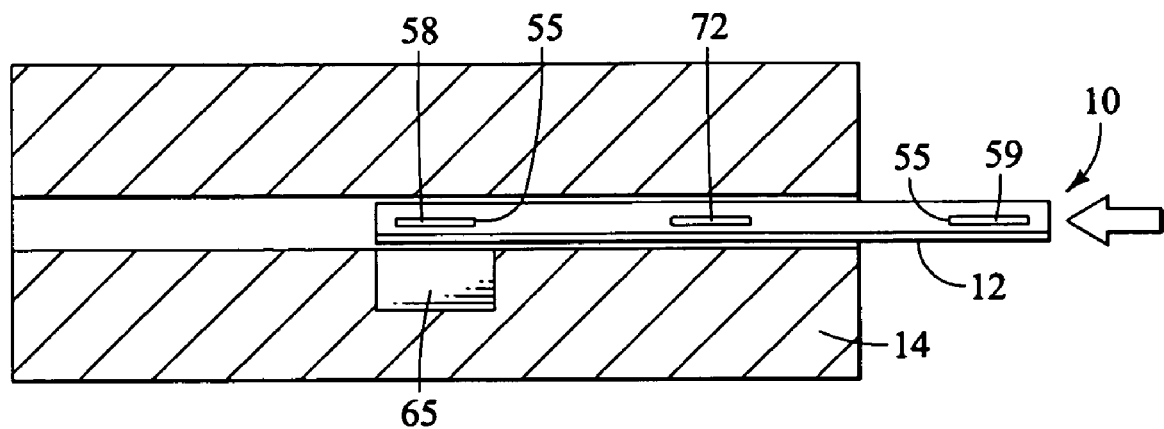
FIG. 7 is a diagrammatic sectional top view showing the card of FIG. 1 being swiped through the card reader of FIG. 6.

Referring now to FIG. 7, this illustration provides a sectional top view showing the card 10 and reader 14 of FIG. 6, where the card 10 is being swiped through the magnetic card reader 14. In FIG. 7, the card 10 is shown by the arrow to be moving towards the left as it is swiped through the reader 14. As the card 10 enters the magnetic card reader 14, the first detection coil 58 which is located beneath the first end 28 of the magnetic stripe 12 will detect the presence of a read head 65 (of the card reader 14). The first detection coil 58 will detect the read head 65 as soon as the card 10 has been moved sufficiently into the card reader 14 so that the first detection coil 58 is proximate the read head 65.

Once the sensor assembly 55 has detected that the card 10 is being swiped through the card reader 14, the sensor assembly 55 will send a signal to the processor 50, notifying the processor 50 that the card 10 is being swiped. If the first sensor 58 detects that the card 10 is being swiped, the signal is sent from the first sensor 58 to the processor 50 by the first sensor processor connection 68. If the second sensor 59 detects that the card 10 is being swiped, the signal is sent from the second sensor 59 to the processor 50 by the second sensor-processor connection 69. In either case, the sensor assembly or assemblies 55 detect engagement of the card 10 with the card reader 14, and notifies the processor 50 of the engagement (i.e., the swiping).

Although the preferred version illustrated uses dual sensors 55, 59 it is alternatively possible to use more reader sensors or a single reader sensor. Depending on the configuration, the response time will vary. The reader sensor serves to indicate that the card has encountered a card reader seeking information from the card, such as at card stripe 12.

Jamming Assembly

Figure 8:
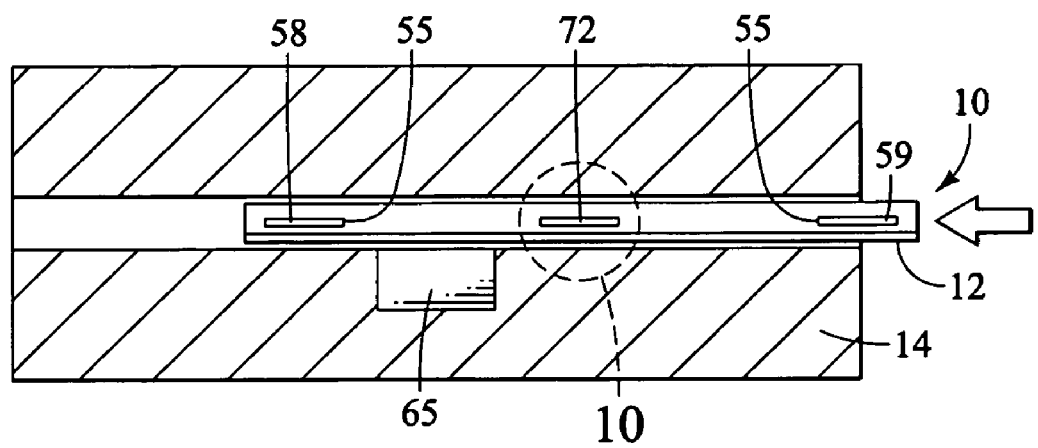
FIG. 8 is a diagrammatic sectional top view showing the card of FIG. 1 being swiped through the card reader of FIG. 6, similar to FIG. 7, with the card further inserted.
Figure 9:
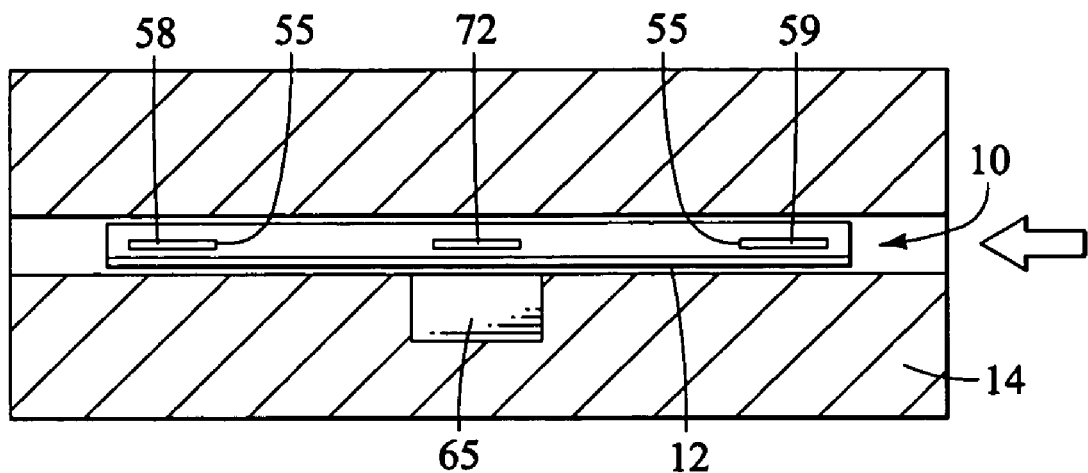
FIG. 9 is a diagrammatic sectional top view showing the card of FIG. 1 being swiped through the card reader of FIG. 6, similar to FIGS. 7 and 8, with the card still further inserted into the card reader.
Figure 10:
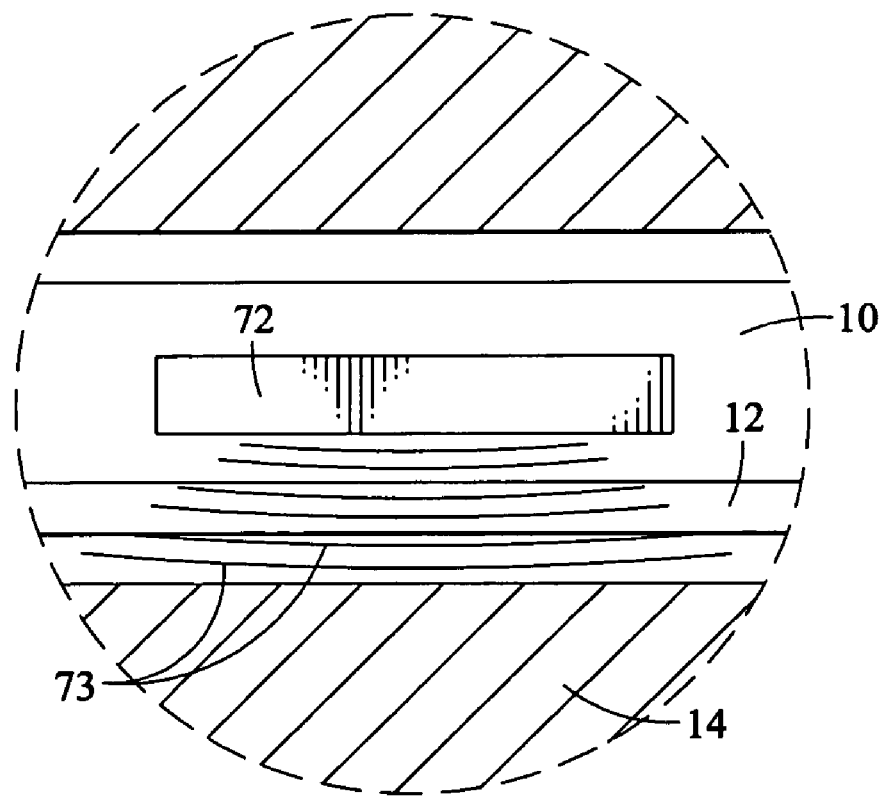
FIG. 10 is a diagrammatic sectional top view showing a portion of FIG. 8, as circled by circle 10, in accordance with one aspect of some of the inventions described herein.

Referring to FIGS. 5 and 7–10, as shown, card 10 also includes a jammer assembly or jammer 72. As shown in FIGS. 8 and 10, the jammer 72 can be positioned adjacent to the magnetic stripe 12. The jammer 72 is configured or adapted to emit a signal 73. The signal 73 which is emitted from the jammer 72 can be directed towards the magnetic stripe 12, and in operation the signal 73 affects the information read or stored on at least a portion of the magnetic stripe 12. The effect that the signal 73 has on the information depends on the energy level of the signal 73 emitted. When the signal 73 is a low energy signal it is termed an interfering signal. When the signal 73 is a high energy signal it is termed an invalidating or in some embodiments an erasing signal. The signal 73 illustrated in FIG. 10 can represent either interfering signals, invalidating signals, or erasing signals used to perform some of the preferred jamming operations.

In one implementation when the card 10 is swiped through the card reader 14 without first entering the correct authentication data, jammer 72 is adapted to emit a jamming signal 73 which causes the magnetic card reader 14 to sense or otherwise consider the magnetic stripe 12 to be invalid. In another implementation the jamming signal 73 which is emitted temporarily renders at least a portion of the magnetic stripe 12 unreadable when the card 10 is swiped through the card reader 14 without first entering the correct authentication data. The jamming signal 73 can temporarily confuse and disable the information encoded on at least a portion of the magnetic stripe 12 without erasing or otherwise changing the information.

Jammer 72 can also be adapted to perform by emitting an erasing signal 73 which erases at least a portion of the magnetic stripe 12. Once the erasing signal 73 erases the information, the card 10 is permanently disabled. Thus, this step performs by permanently disabling the card.

Emission of a jamming signal which is an erasing signal 73 can be triggered by a variety of selected occurrences. For example, in one implementation, the processor 50 can be configured to count the entries in which the authentication data entered by the user failed to match the reference data, and to emit the erasing signal 73 when the count of entries exceeds a predetermined number. The failed attempts may be sequential or non-sequential. This implementation is described in more detail below with reference to FIG. 11.

In another implementation, the processor 50 can be configured to count sequential swipes in which the card 10 is swiped without first entering the correct authentication data, and to emit the erasing signal 73 when the count of sequential swipes exceeds a predetermined disabling threshold number. This implementation is described in more detail below with reference to FIG. 12.

The invention contemplates that the jammer assembly 72 can be of any suitable design. In one implementation, jammer 72 can comprise a magnetic pattern confusion coil. The magnetic pattern confusion coil 72 can operate in two modes, a confusion mode and an erase mode. In the confusion mode, the pattern confusion coil 72 can release a burst of energy 73 that is strong enough to temporarily confuse information stored on the magnetic stripe 12, but that is not strong enough to erase the information stored on the magnetic stripe 12. In contrast, in the erase mode, the pattern confusion coil 72 can release a burst of energy 73 that is strong enough to permanently invalidate, erase or otherwise change or damage the information stored on the magnetic stripe 12 and permanently disable the card. In another mode the reader head is merely confused without effect on the stripe.

To prevent jammer 72 from interfering with reading the magnetic stripe 12, the user can enter the correct authentication data. If the user enters the correct authentication data before swiping the card 10, the processor 50 will compare the authentication data entered by the user to the reference data stored in the memory 45 and will determine that the authentication data entered by the user is correct or acceptable authentication data. In this situation, the processor 50 will send a signal to the jammer 72 over the processor jammer connection 75. This signal will cause the jammer 72 to temporarily stop emitting the jamming signal 73 when the card 10 is swiped, thereby allowing the information stored on the magnetic stripe 12 to be read as it is swiped through the magnetic card reader 14.

In one implementation, after entry of the correct authentication data, the jammer 72 is temporarily stopped from emitting the jamming signal 73 for a predetermined period of time. This predetermined period of time can be selected to allow enough time for the card 10 to be swiped and the financial transaction completed. By way of example, the the jammer 72 can be temporarily stopped from emitting the jamming signal 73 for thirty seconds once the processor 50 has determined that the correct authentication data has been entered. The use of any other suitable period of time is contemplated by the present invention.

In another implementation, after entry of the correct authentication data, the jammer 72 is temporarily stopped from emitting the jamming signal 73 until the processor 50 determines that the card 10 has been swiped through the magnetic card reader 14. After the card 10 has been swiped, the jammer 72 is automatically returned to its normal or default state.

Code Supplementer

Figure 13:
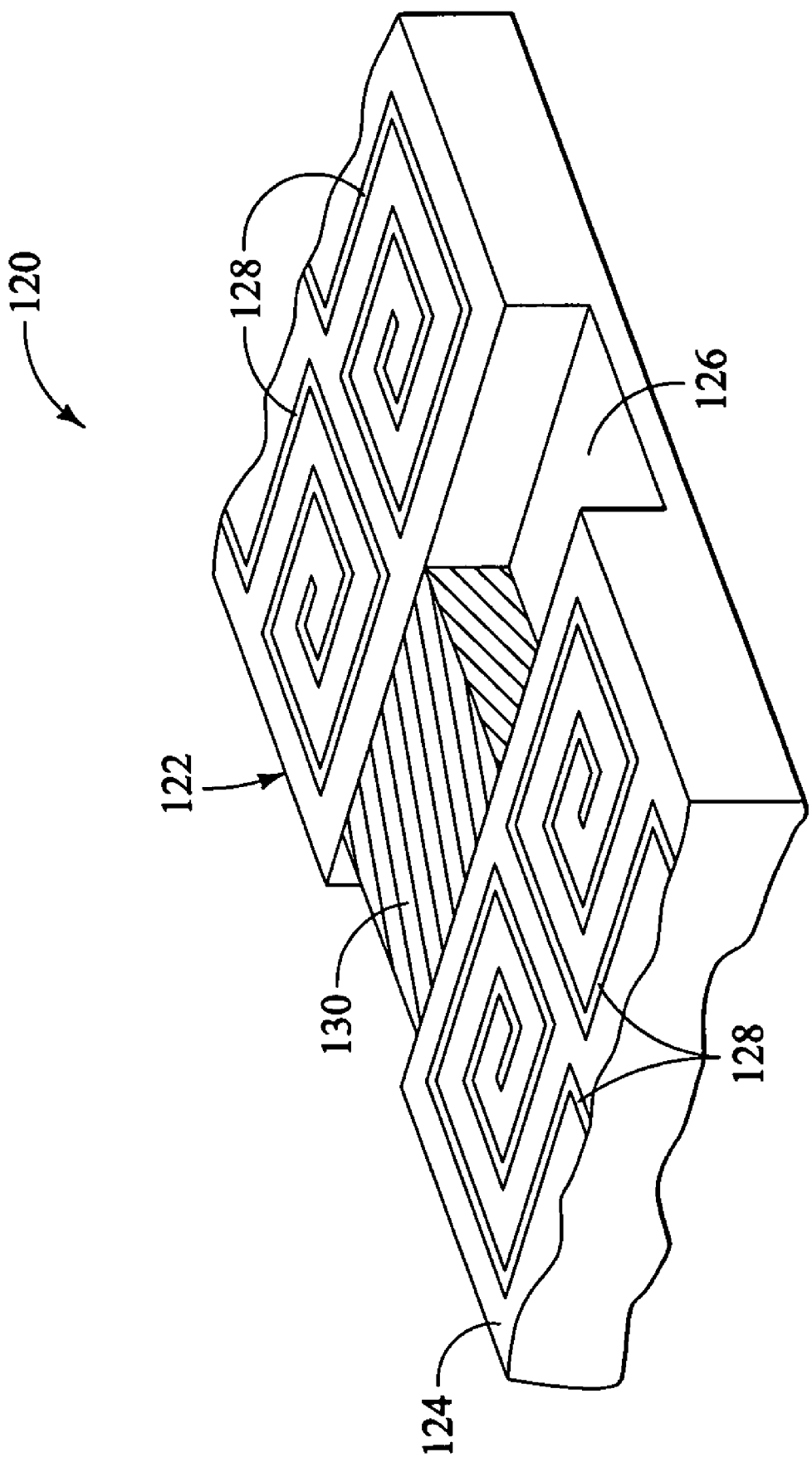
FIG. 13 is a perspective diagrammatic view indicating one form of jamming and activating device which may be used in some forms of the inventions described herein.

In further forms of the invention, the preferred construction includes a stripe code supplementer (see FIG. 13). The code supplementing function of code supplementer 120 may be used to further reduce the risk of misuse or fraud. The code supplementer functions to provide a desired bit or bits of information for reading by the card reader. This allows the magnetic stripe to be programmed or coded with one or more bits missing or incorrect. The code supplementer upon proper authentication outputs a bit or bits so that the magnetic stripe is supplemented. This typically will complete the code and allow valid use.

The code supplementer 120 shown is advantageously provided in the form of one or more coils 128 or other supplementing devices. As shown, one or more of coils 128 may perform the supplementation function. The supplementation may alternatively be provided by a magnet 130 which can be activated. The activation may be direct to the coil or coils, or the coil or coils 128 may move a magnet 130 within channel 126. The activation and subsequent supplementation function would only be performed after desired authentication.

The code supplementer 120 may be separate from or form all or part of the jammer. Coils 128 may perform the jamming function in some modes of operation. In others, the coils are stimulated by greater current or otherwise to perform the jamming function. Thus, device 120 may be either the jammer, a code supplementer, or may combine both functions therein.

The device 120 may also include a body portion 122 that is made from a suitable substrate material 124 in which the coils 128 are formed. This may be suitably performed using nanometer type electromechanical device 120. The device would in some forms of the invention be placed as indicated by jammer 72 or otherwise be positioned along the magnetic stripe.

Other Aspects of Securing Information

The present invention contemplates various apparatus and methods for securing confidential information stored on the magnetic stripe 12. For example, as described above, some implementations the present invention contemplate that the jamming assembly 72 be adapted to release an erasing signal 73 which permanently disables the card 10 upon the occurrence of certain events. Examples of such are further described in the paragraphs below.

Figure 11:
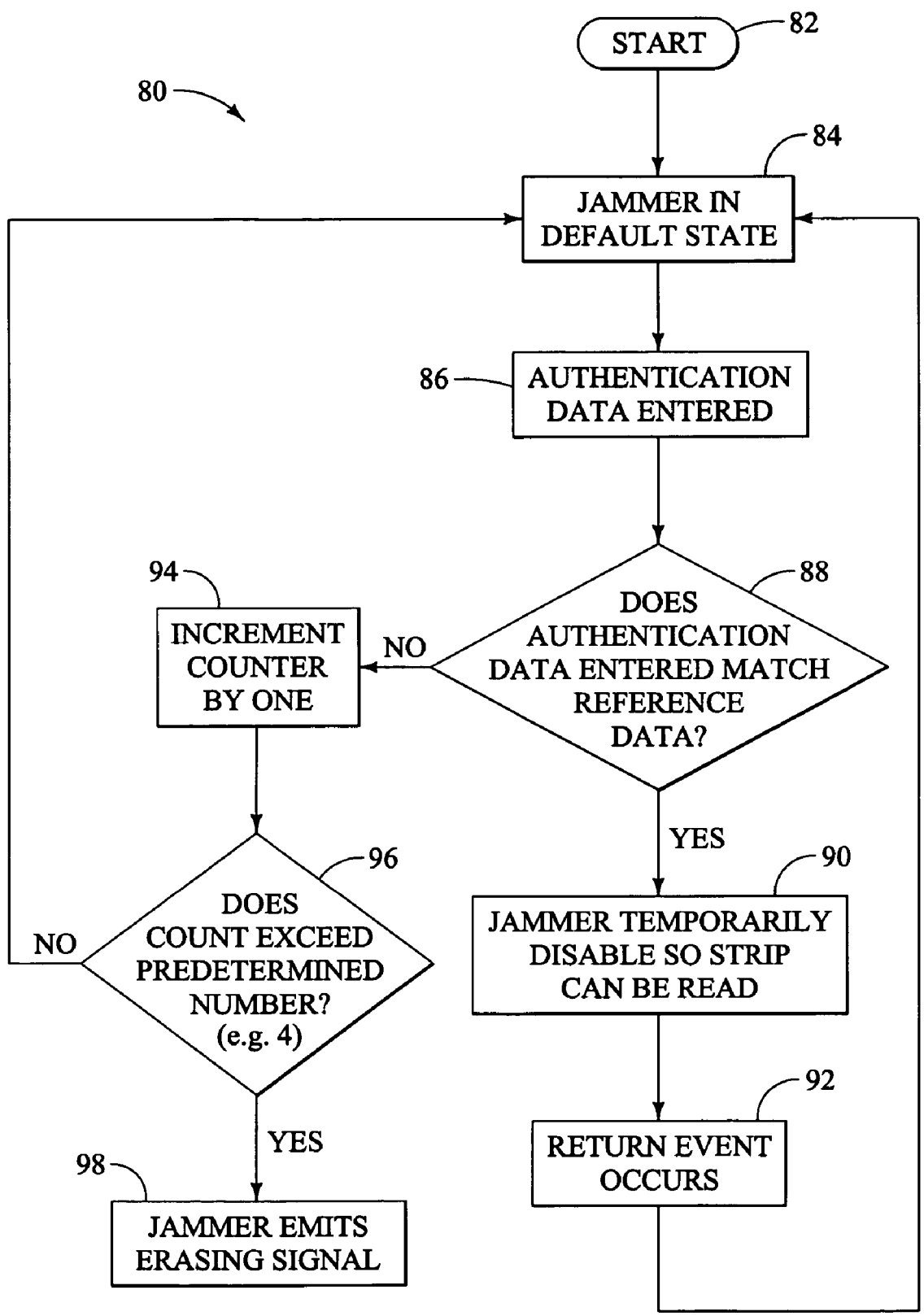
FIG. 11 is a flow chart illustrating certain aspects of the present invention in accordance with one process of the present invention.

For example, referring primarily to FIG. 11, an exemplary flowchart 80 is described with respect to one aspect of securing information stored on the magnetic stripe 12 in accordance with one embodiment of the present invention. The numbers used in FIG. 11 to describe the flowchart 80 are by way of example only, and not by way of limitation. FIG. 11 generally describes one implementation in which the processor 50 is further configured to count a number of sequential entries made by the user, in which the authentication data entered by the user fails to match the reference data stored in the memory 45. In this implementation, the jammer 72 is further adapted to emit an erasing signal 73 which erases a portion of the magnetic stripe 12 once the count of the sequential entries exceeds a predetermined number.

As shown in FIG. 11, the flowchart 80 starts a numeral 82. Next, at step 84, the jammer 72 is shown to be in its default state. In the default, state, the jammer 72 will emit a jamming signal 73 which temporarily renders at least a portion of the magnetic stripe 12 unreadable when the card 10 is swiped through the card reader 14 without first entering correct authentication data.

At step 86 authentication data is entered using the input device 30. The authentication data entered may be correct (i.e., the authentication data entered matches the reference data stored in the memory 45) or incorrect (i.e., the authentication data entered does not match the reference data stored in the memory 45).

At step 88, the processor 50 compares the authentication data entered or otherwise detected using the input device 30 (i.e., data entered by the user) or other detector with the reference data stored in the memory 45, and determines whether the data entered matches the reference data. If processor 50 determines that the data entered matches the reference data, then the processor 50 will send a signal to the jammer 72. As shown by step 90, this signal causes the jammer 72 to be temporarily disabled (i.e., to temporarily stop emitting the jamming signal 73 when the card 10 is swiped), thereby allowing the information stored on the magnetic stripe 12 to be read as it is swiped through the magnetic card reader 14.

At step 92, a return event may occur. The return event can be any suitable event which has been selected. The return event can be for example, the expiration of a predetermined time period, or the swiping of the card 10 through the card reader 14. Once the return event has occurred, the card 10 will automatically return to it's default state (i.e., will return to step 84) as shown by the arrow in FIG. 11.

If at step 88 the processor 50 determines that the data entered by the user does not match the reference data, the processor 50 can be further configured to count sequential entries in which the authentication data entered by the user failed to match the reference data. In other words, the processor can track the number of incorrect entries which have been sequentially made. Accordingly, at step 94, a counter is incremented by one each time an incorrect entry is sequentially made.

At step 96, the processor 50 determines whether the count exceeds a predetermined number. By way of example, the number four can be chosen to be the predetermined number. In that case, when the number of incorrect entries which are sequentially entered exceeds this predetermined threshold number (e.g., four), the jammer 72 can be configured to permanently disable the card 10. Accordingly, at step 98, the jammer 72 can be switched to emit an erasing signal 73 which erases a portion of the magnetic stripe 12.

Figure 12:
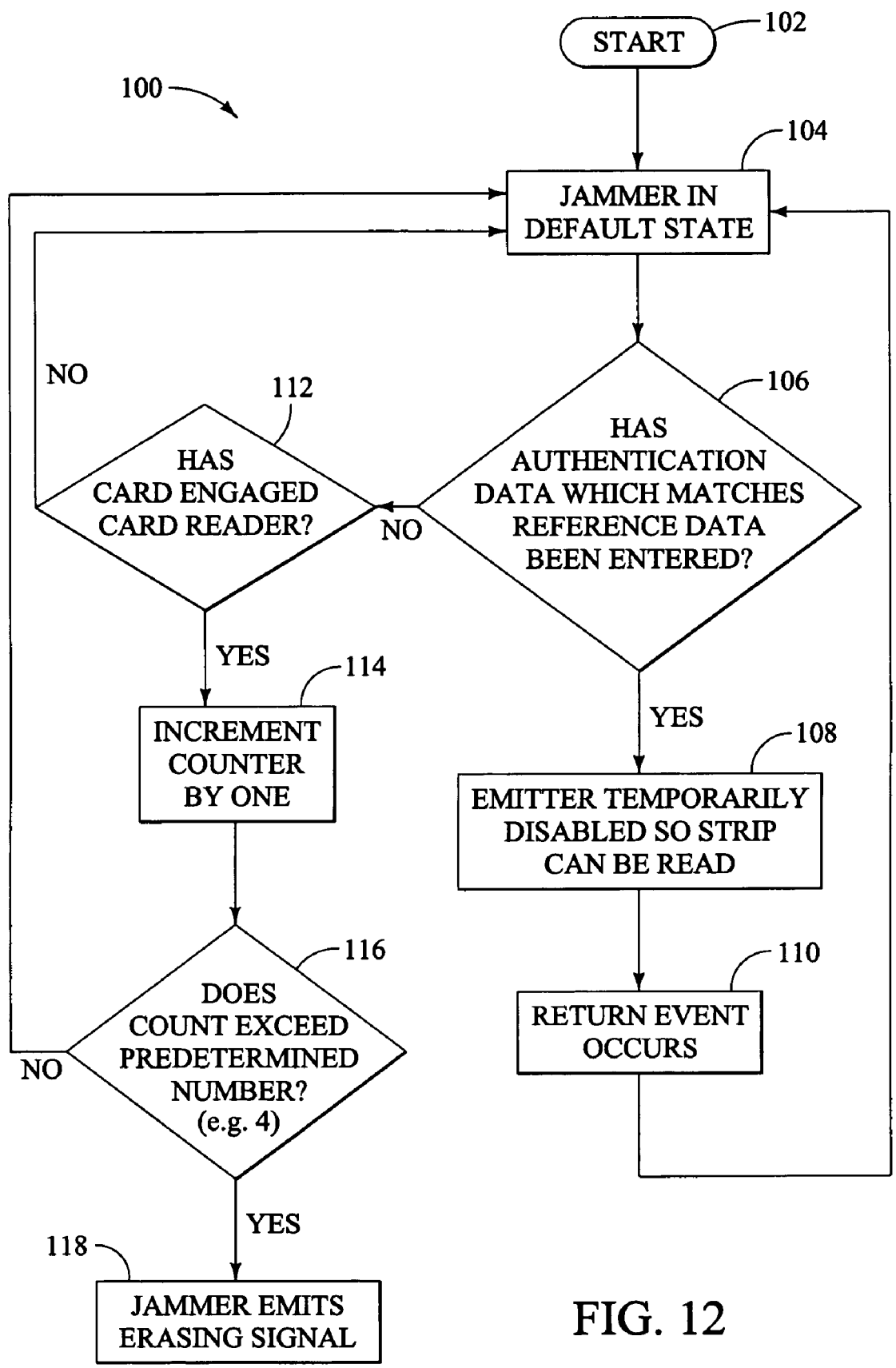
FIG. 12 is a flow chart illustrating certain aspects of the present invention in accordance with a second process of the present invention.

Turning now primarily to FIG. 12, another exemplary flowchart 100 is described with respect to one aspect of securing information stored on the magnetic stripe 12 in accordance with one embodiment of present invention. The numbers used in FIG. 12 to describe the flowchart are by way of example only, and not by way of limitation. FIG. 12 generally describes one implementation in which the processor is further configured to count sequential swipes in which the card 10 is swiped without first entering the correct authentication data. The jammer 72 is further adapted to emit an erasing signal 73 which erases a portion of the magnetic stripe 12 when the count of sequential swipes exceeds a predetermined number.

As depicted in FIG. 12, the flowchart 100 starts at numeral 102. Next at step 104, the jammer 72 is shown to be in its default state. In the default state, the jammer 72 will emit a jamming signal 73 which temporarily renders at least a portion of the magnetic stripe 12 unreadable when the card 10 is swiped through the card reader 14 without first entering correct authentication data.

At step 106 the processor 50 determines whether correct authentication data has been entered using the input device 30. If the processor 50 determines that the correct authentication data has been entered, the processor 50 will send a signal to the jammer 72. Accordingly, as shown by step 108, this signal causes the jammer 72 to temporarily stop emitting the jamming signal 73 when the card 10 is swiped, thereby allowing the information stored on the magnetic stripe 12 to be read as it is swiped through the magnetic card reader 14. In other words, the jammer 72 is temporarily disabled so that the card 10 can be swiped and read.

At step 110, a return event occurs, this return event can be for example the expiration of a predetermined time period, or the swiping of the card 10 through the card reader 14. Once the return event occurs, the card 10 will automatically return to its default state (i.e., will return to step 104) as shown by the arrow in FIG. 12.

If at step 106, the processor 50 determines that the correct authentication data has not been entered, the processor 50 can perform yet another function. Accordingly, at step 112, the processor 50 can determine whether the card 10 has been swiped through or has engaged a magnetic card reader 14 without the correct authentication data having first been entered. If the card 10 has been swiped through the card reader 14 without entry of the correct authentication data, a counter will be incremented by one (as shown in step 114).

At step 116 the processor determines whether the count exceeds a predetermined number. By way of example, the number four can be chosen. In that case, when the count of sequential swipes exceeds the predetermined number (e.g., four), the jammer 72 can be configured to permanently disable the card 10. Accordingly, at step 118, the jammer 72 can be switched to emit an erasing signal 73 which invalidates, erases, or otherwise changes a portion of the magnetic stripe 12 so that operation is affected.

Visual and Auditory Indicators

Referring to FIGS. 1 and 5, the card 10 can comprise one or more indicators which are configured to alert the user and/or merchant when the processor 50 has determined that the user has entered the correct authentication data and that the card 10 is ready to be read by the magnetic card reader 14. The use of any suitable indicator is contemplated. In FIGS. 1 and 5, the card 10 includes an auditory indicator 130, and a visual indicator 132 (indicators 130 and 132 are shown in phantom lines in FIG. 5). The auditory indicator 130 can emit a sound which alerts the user when the card 10 is ready to be swiped by the reader 14, and be silent when the card 10 is in its default state. The visual indicator 132 can emit an indication of readiness, such as a visible signal when the card 10 is ready to be swiped. For example, the visual indicator 132 can comprise a light emitting diode (LED) which is illuminated when the card 10 is ready to be swiped, and which is not illuminated when the card 10 is in its default state.

The auditory indicator 130 is electrically coupled to the processor 50 by processor-auditory indicator connection 133. Similarly, the visual indicator 132 is coupled to the processor 50 by the processor visual indication connection 134. When the processor 50 determines that the user has entered the correct authentication data, and the card 10 is ready to be swiped by the reader 14, the processor 50 can send appropriate signals to activate the auditory indicator 130 and/or visual indicator 132 as appropriate.

Power Source

Referring to once again to FIG. 5, the card 10 also includes a power source 140. The power source 140 is adapted to supply power to the processor 50, the sensor assembly 55, and the jammer 72. The use of any suitable power source is contemplated by the present invention. For example, in the embodiment depicted in FIG. 5, the power source 140 is a battery. The power source 140 provides power to the jamming assembly 72 by the jammer power connection 142. Power is supplied to the first sensor 58 by the first sensor power connection 148, and is supplied to the second sensor 59 by the second sensor power connection 149. Power is supplied to the auditory indicator 130 by the auditory indicator power connection 150. Similarly, power is supplied to the visual indicator 132 by the visual indicator power connection 152.

In alternative constructions of apparatuses according to the inventions described herein, the power supply may be a photovotaic generator, capacitor or other storage or generation devices or combinations and subcombinations thereof.

Methods

The present invention also provides novel methods. Some or all aspects may be described above or elsewhere herein. Some of the novel methods concern securing information stored on a portable charge, debit or similar card 10 which is to be read by a magnetic card reader 14. For example in one implementation, the method includes providing the card 10 to a user. The card 10 which is provided to the user includes a magnetic stripe 12 storing the information, a sensor assembly 55 configured to detect when the card 10 is swiped through the magnetic card reader 14, and a jammer 72 positioned adjacent to the magnetic stripe 12 and adapted to emit a jamming signal 75. The jammer 72 is adapted to emit the jamming signal 75 which causes the magnetic card reader 14 to consider the magnetic stripe 12 invalid when the card 10 is swiped without first entering correct authentication data.

In one implementation, when the correct authentication data has not first been entered, the method can include swiping the card 10 through the magnetic card reader 14, detecting the swiping of the card 10, and then emitting the jamming signal 75.

In another implementation, the method can include entering the correct authentication data to temporarily deactivate the jammer 72, and then after entering the correct authentication data, swiping the card 10 through the magnetic card reader 14. In yet another implementation, after swiping the card 10 through the magnetic card reader 14, the method further comprises automatically reactivating the jammer 72 once a predetermined period of time expires.

The present invention contemplates entering authentication data using any suitable method. For example, in one variation, the step of entering the correct authentication data comprises entering a PIN on a keypad 34, while in another variation the step of entering the correct authentication data comprises placing a digit on a biometric sensor 40.

Further Aspects and Features

The above description has set out various features and aspects of the invention and the preferred embodiments thereof. Such aspects and features may further be defined according to the following claims which may individually or in various combinations help to define the invention.

Interpretation Note

The invention has been described in language directed to the current embodiments shown and described with regard to various structural and methodological features. The scope of protection as defined by the claims is not intended to be necessarily limited to the specific features shown and described. Other forms and equivalents for implementing the inventions can be made without departing from the scope of concepts properly protected hereby.

I claim:

1. An apparatus forming a portable identification card which can be read using a magnetic swipe card reader, comprising:
    a magnetic stripe for storing information;
    at least one input device adapted for a user to enter authentication data;
    a memory for storing reference data;
    a processor configured to compare the authentication data entered by the user to the reference data stored in the memory to determine whether the authentication data entered by the user is correct authentication data;
    a sensor assembly configured to detect when the card is swiped through the magnetic card reader;
    a jammer adapted to emit at least one jamming signal which causes the magnetic card reader to consider the magnetic stripe to be invalid when the card is swiped without first entering the correct authentication data; and,
    a power source adapted to supply power to the processor, the sensor assembly, and the jammer;
    wherein the processor is configured to count entries of authentication data entered by the user which failed to match the reference data, and wherein the apparatus is inactivated when the entries of authentication data exceeds a predetermined number by affecting the magnetic stripe;
    wherein the processor is further configured to count sequential entries in which the authentication data entered by the user failed to match the reference data, and wherein the jammer is further adapted to emit an erasing signal which erases a portion of the magnetic stripe when the count of sequential entries exceeds a predetermined number.

2. The apparatus of claim 1 wherein the sensor assembly comprises a plurality of sensors.

3. The apparatus of claim 2 wherein the plurality of sensors are positioned near the ends of the magnetic stripe.

4. The apparatus of claim 1 wherein a portion of the sensor assembly is positioned beneath the magnetic stripe.

5. The apparatus of claim 1 wherein the at least one jamming signal comprises a burst of electromagnetic energy which confuses the information stored on the magnetic stripe.

6. The apparatus of claim 1 wherein the input device comprises a keypad adapted to receive the authentication data entered by the user.

7. The apparatus of claim 1 wherein the input device comprises a biometric sensor adapted to receive the authentication data entered by the user.

8. An apparatus forming a portable identification card which can be read using a magnetic swipe card reader, comprising:
    a magnetic stripe for storing information;

an input device adapted for a user to enter authentication data;

a memory for storing reference data;

a processor configured to compare the authentication data entered by the user to the reference data stored in the memory to determine whether the authentication data entered by the user is correct authentication data;

a sensor assembly configured to detect when the card is swiped through the magnetic card reader;

a jammer adapted to emit jamming signal which causes the magnetic card reader to consider the magnetic stripe to be invalid when the card is swiped without first entering the correct authentication data; and, a power source adapted to supply power to the processor, the sensor assembly, and the jammer;

wherein the processor is configured to count entries of authentication data entered by the user which failed to match the reference data, and wherein the apparatus is inactivated when the entries of authentication data exceeds a predetermined number by affecting the magnetic stripe;

wherein the processor is further configured to count sequential entries in which the authentication data entered by the user failed to match the reference data, and wherein the jammer is further adapted to emit an erasing signal which erases a portion of the magnetic stripe when the count of sequential entries exceeds a predetermined number;

wherein the processor is further configured to count sequential swipes in which the card is swiped without first entering the correct authentication data, and wherein the jammer is further adapted to emit an erasing signal which erases a portion of the magnetic stripe when the count of sequential swipes exceeds a predetermined number.

9. The apparatus of claim 8 and further comprising an indicator configured to alert the user when the processor has determined that the user has entered the correct authentication data and the card is ready to be read by the magnetic card reader.

10. The apparatus of claim 8 wherein a portion of the sensor assembly is positioned beneath the magnetic stripe.

11. The apparatus of claim 8 wherein the at least one jamming signal comprises a burst of electromagnetic energy which confuses the information stored on the magnetic stripe.

12. The apparatus of claim 8 wherein the input device comprises a keypad adapted to receive the authentication data entered by the user.

13. The apparatus of claim 8 wherein the input device comprises a biometric sensor adapted to receive the authentication data entered by the user.

14. An apparatus forming a portable charge, debit or similar identification card which can be read using a magnetic card reader, comprising:

a magnetic encoded code for storing information;

a jamming assembly configured to emit a jamming signal which at least temporarily renders a portion of the magnetic stripe unreadable when the card is passed through a card reader without first entering correct authentication data; and a power source adapted to supply power to the jamming assembly;

wherein the jamming assembly is configured to count entries of authentication data entered by the user which failed to match the reference data, and wherein the apparatus is inactivated when the entries of authentication data exceeds a predetermined number by affecting the magnetic stripe;

wherein the jamming assembly is further configured to emit an erasing signal which erases a portion of the magnetic stripe once a predetermined number of incorrect authentication data entries have been sequentially entered.

15. The apparatus of claim 14 wherein a portion of the sensor assembly is positioned beneath the magnetic stripe.

16. The apparatus of claim 14 wherein the at least one jamming signal comprises a burst of electromagnetic energy which confuses the information stored on the magnetic stripe.

17. The apparatus of claim 14 wherein the input device comprises a keypad adapted to receive the authentication data entered by the user.

18. The apparatus of claim 14 wherein the input device comprises a biometric sensor adapted to receive the authentication data entered by the user.

19. An apparatus forming a portable charge, debit or similar identification card which can be read using a magnetic card reader, comprising:

a magnetic encoded code for storing information;

a jamming assembly configured to emit a jamming signal which at least temporarily renders a portion of the magnetic stripe unreadable when the card is passed through a card reader without first entering correct authentication data; and a power source adapted to supply power to the jamming assembly;

wherein the jamming assembly is configured to count entries of authentication data entered by the user which failed to match the reference data, and wherein the apparatus is inactivated when the entries of authentication data exceeds a predetermined number by affecting the magnetic stripe;

wherein the jamming system is further configured to emit an erasing signal which erases a portion of the magnetic stripe once the card has been sequentially passed through the card reader a predetermined number of times without entry of the correct authentication data.

20. The apparatus of claim 19 wherein a portion of the sensor assembly is positioned beneath the magnetic stripe.

21. The apparatus of claim 19 wherein the at least one jamming signal comprises a burst of electromagnetic energy which confuses the information stored on the magnetic stripe.

22. The apparatus of claim 19 wherein the input device comprises a keypad adapted to receive the authentication data entered by the user.

23. The apparatus of claim 19 wherein the input device comprises a biometric sensor adapted to receive the authentication data entered by the user.

* * * * *